United States Patent
Andrews et al.

(10) Patent No.: US 10,693,771 B2
(45) Date of Patent: Jun. 23, 2020

(54) OPTIMIZED MESSAGE FLOODING ACROSS NODES OF A DISTRIBUTED PLATFORM

(71) Applicant: Verizon Digital Media Services Inc., Dulles, VA (US)

(72) Inventors: David Andrews, Los Angeles, CA (US); Reed Morrison, Torrance, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 289 days.

(21) Appl. No.: 15/811,046

(22) Filed: Nov. 13, 2017

(65) Prior Publication Data

US 2019/0149460 A1    May 16, 2019

(51) Int. Cl.
| | |
|---|---|
| *H04L 12/721* | (2013.01) |
| *H04L 12/707* | (2013.01) |
| *H04L 29/08* | (2006.01) |
| *H04L 12/18* | (2006.01) |
| *H04L 12/24* | (2006.01) |

(52) U.S. Cl.
CPC .............. *H04L 45/32* (2013.01); *H04L 45/24* (2013.01); *H04L 67/26* (2013.01); *H04L 12/18* (2013.01); *H04L 41/0836* (2013.01); *H04L 45/70* (2013.01)

(58) Field of Classification Search
None
See application file for complete search history.

(56) References Cited

U.S. PATENT DOCUMENTS

| | | | | |
|---|---|---|---|---|
| 6,829,654 B1* | 12/2004 | Jungck | ............... | H04L 47/10 370/475 |
| 7,886,055 B1* | 2/2011 | Zhou | ............... | H04L 67/1004 709/223 |
| 8,347,075 B1* | 1/2013 | Zhang | ............... | H04L 63/1441 380/256 |
| 2006/0198324 A1* | 9/2006 | Nerses | ............... | H04M 3/56 370/260 |
| 2013/0159517 A1* | 6/2013 | Kumarjiguda | ...... | H04L 67/2809 709/224 |
| 2017/0105137 A1* | 4/2017 | Hung | ............... | H04L 43/028 |

* cited by examiner

*Primary Examiner* — James A Edwards
(74) *Attorney, Agent, or Firm* — Ansari Katiraei LLP; Arman Katiraei; Sadiq Ansari (57) ABSTRACT

Optimized message flooding is provided for time sensitive or real-time contacting of nodes across a distributed platform. The propagation of messaging across the distributed platform is accelerated based on a parallel fan-out distribution of the flood messaging from increasing numbers of nodes with the distribution occurring over existing connections maintained between different sets of nodes. Responses are propagated via a reverse traversal of the nodes. The reverse traversal is optimized by merging responses at different tiers. A set of triggers set at the different nodes specify conditions with which to identify and preempt the slowest nodes of a lower tier from withholding message flooding completion. As such, desired messaging and responses can be collected from across the distributed platform in a determinate amount of time with minimal overhead.

16 Claims, 7 Drawing Sheets

OPTIMIZED MESSAGE FLOODING ACROSS NODES OF A DISTRIBUTED PLATFORM

BACKGROUND ART

A distributed platform deploys servers in different physical locations. A large distributed platform can have hundreds if not thousands of servers operating from the different physical locations. The distributed platform operates these servers to provide content or services from the different physical locations. The servers can provide the content or services for or on behalf of different customers. Content delivery networks (CDNs), cloud service providers, and hosting platforms are examples of some such distributed platforms.

Message flooding is a term for contacting each and every server of the distributed platform. In particular, message flooding is for contacting the servers in a substantially simultaneous manner. There are certain situations in which message flooding is desired. Some such situations include contacting the servers in order to configure the servers or send commands to the servers. Such contacts change control logic, resource allocation, or operational behavior of the servers. Some other situations can include contacting the servers to query the servers and to receive information in response to the queries. For instance, the distributed platform contacts each server in order to collect statistics that help isolate an attack to a specific set of servers of the distributed platform. Subsequent contacts could then be used to reconfigure the servers in combatting the identified attack. In any case, message flooding is a critical tool at the disposal of the distributed platform administrator in order to communicate rapidly with each and every node of the platform for situations that require information from or information to all nodes of the distributed platform.

Traditional means of message flooding are inefficient and slow to complete. This is due in part to the overhead and delays associated with establishing individual connections with each of the distributed platform servers before contacting them. Establishing each such connection involves performing a separate first handshake with each server. A second handshake may also be performed in order to secure or encrypt the connections. The handshakes consume server resources and also introduce delay depending on the number of network hops that the handshake messaging traverses. In other words, the message flooding cannot be initiated until each and every connection is established.

Even once the connections are established, the message flood is not complete until each server is contacted and a response is received from the contacted servers. Traditional message flooding typically involves establishing all such connections from a central server and propagating the contacts from the central server. The central server is closer to some of the distributed platform servers while more distant to others. The propagation delay for any connection establishment or exchanged messaging will therefore vary greatly. The delay is exacerbated because of slow start mechanisms built into the underlying protocols that control the rate at which messages are sent over the newly established connections.

Establishing the connections and contacting the servers is also a factor that contributes to the overall delay for completing the message flooding. In particular, the central server has insufficient resources to establish all such connections and issue all such messaging in parallel when the distributed platform has hundreds or thousands of servers that are included as part of the message flood. Moreover, frequent flooding of the distributed platform introduces so much traffic and overhead that bottlenecks may form on the distributed platform servers or along the network pathways to the servers.

Broadcast or multicast messaging may be used instead of establishing individual connections. This however is an insecure manner with which to perform the message flooding and could expose the distributed platform to significant attacks. Moreover, while the broadcast or multicast messaging may be a good vehicle with which to contact each of the distributed platform servers, they are a bad vehicle with which to collect responds from each of the servers.

A further issue with the above implementations is the indeterminate amount of time to complete traditional message flooding. The message flooding is complete once all distributed platform servers acknowledge and respond to each contact. The completion time is therefore determined based on the server that is slowest to respond. The various delays discussed above as well as network, server, and other failures can cause a particular message flood to take several minutes to complete or an indeterminate amount of time if one server cannot be contacted because of a network link, server, or other failure.

Traditional message flooding therefore cannot be used for time sensitive messaging or when responses are immediately required based on the issues identified above. There is therefore a need for efficient and fast contacting of a large number of servers in a distributed platform. More specifically, there is a need to eliminate or minimize much of the overhead associated with a message flood initiating server establishing separate connections, messaging each server, and receiving responses from each of the distributed platform. There is also a need to provide responses within a determinate amount of time so that the contacting mechanism can be used for time sensitive or real-time applications.

BRIEF DESCRIPTION OF THE DRAWINGS

A preferred embodiment for optimized messaging flooding across nodes of a distributed platform will now be described, by way of example only, with reference to the accompanying drawings in which.

DETAILED DESCRIPTION

Optimized message flooding is provided for time sensitive or real-time contacting of nodes across a distributed platform. The optimized message flooding provides and leverages a distributed hierarchical architecture to flood messages across the distributed platform nodes and to collect responses from the contacted nodes in a substantially simultaneous manner. The distributed hierarchical architecture limits the number of hops traversed between contacted nodes in order to reduce network latency and the potential points of failure. The distributed hierarchical architecture also maintains persistent connections between different subsets of nodes so that the entirety of the distributed platform can be contacted without the delays associated with slow start sending of messages or the time and overhead associated with reestablishing connections prior to flooding the messages across the nodes. Cascading triggers set at different tiers of the distributed hierarchical architecture prevent individual network link, server, or other failures from withholding overall completion of the message flood.

Figure 1:
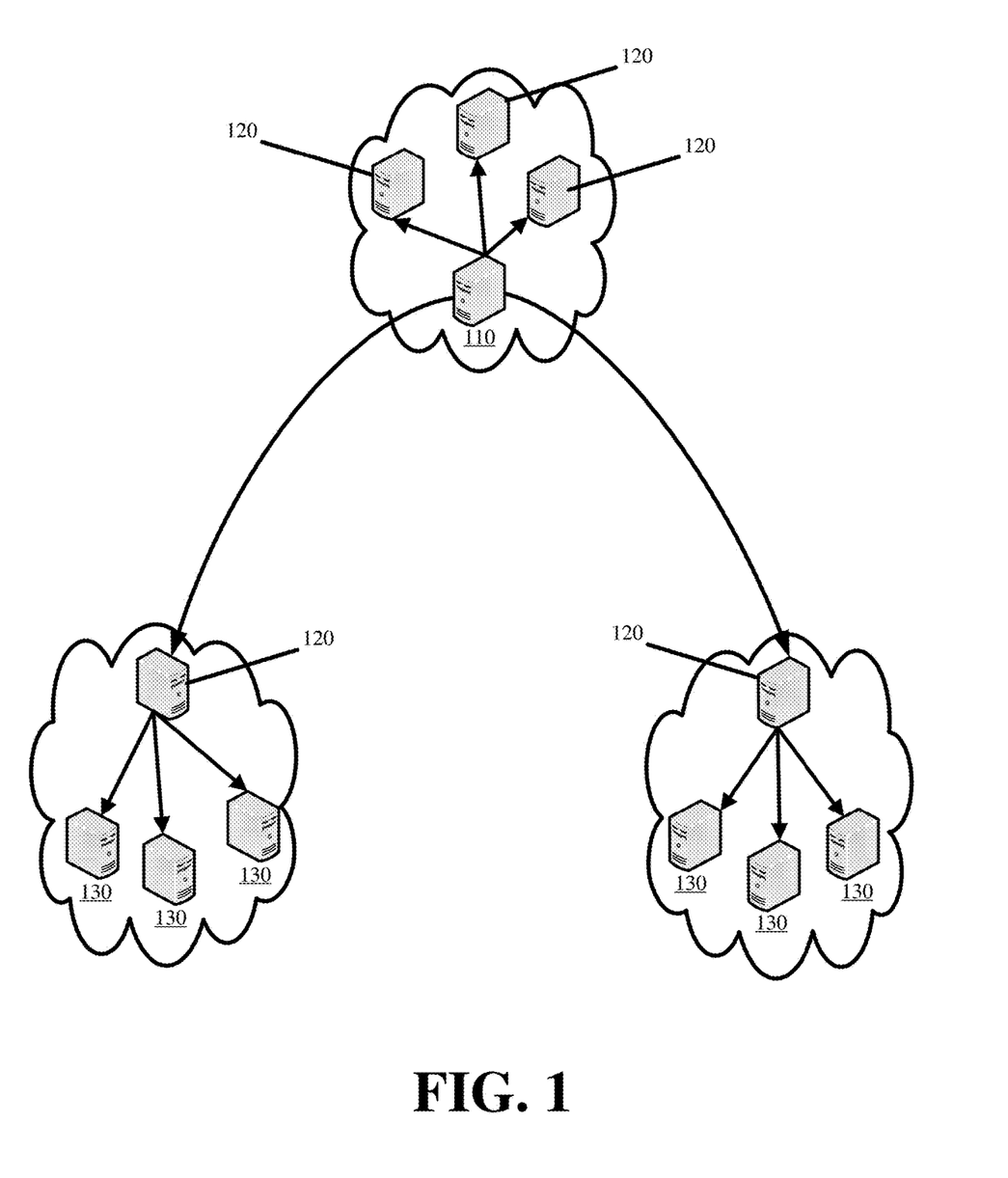
FIG. 1 conceptually illustrates an exemplary distributed hierarchical architecture for optimized message flooding in accordance with some embodiments.

FIG. 1 conceptually illustrates an exemplary distributed hierarchical architecture for optimized message flooding in accordance with some embodiments. The architecture is formed from a hierarchical arrangement of nodes into different tiers, wherein each node represents a server of the distributed platform. In particular, FIG. 1 illustrates a three-tier arrangement of nodes with a first-tier server 110, second-tier servers 120 that are directly contacted by the first-tier server 110, and different sets of third-tier servers 130 that are directly contacted by different second-tier servers 120.

The first-tier server 110 is a root node from which a message flood across the distributed platform is initiated and responses to the message flood are returned. The designation of the servers to the different tiers is arbitrary as the distributed hierarchical architecture permits any server to be the root node.

In some embodiments, the designation of the distributed platform servers to the different tiers of the distributed hierarchical architecture is based on the physical deployment of the servers across a digital network, such as the Internet. In FIG. 1, the designation is based according to the proximity between different sets of servers. The proximity can be in terms of network hops or network latency. Servers in a common tier and linked to a common parent node can be servers in the same point-of-presence (PoP), wherein a PoP represents a set of collocated servers operating to provide content and services to clients in a nearby geographic region. The tiers can alternatively be formed according to other logical or virtual arrangements of the nodes.

Each parent node maintains a connection with each of its children nodes. The connection can be a Transport Control Protocol (TCP) connection with a Transport Layer Security (TLS) connection encrypting messaging passing over the underlying TCP connection. The maintained connections are used for message flooding and other communications between the connected servers. Periodic keep-alive messages are sent on the connections when message flooding or other messages are not sent for some amount of time. Each parent node maintains a mere fraction of the total number of connections needed to flood the entire distributed platform. Accordingly, there is minimal overhead and a minimal performance impact on the parent node in maintaining the connections to its children nodes.

The connections are maintained and effectively become persistent connections in order to avoid the overhead and delay associated with establishing the connections when performing a message flood. The maintained connections also accelerate the propagation of flood messaging because of a negotiated optimal transmission rate that is greater than the initial transmission rate on a newly established connection subjected to slow start flow controls.

Figure 2:
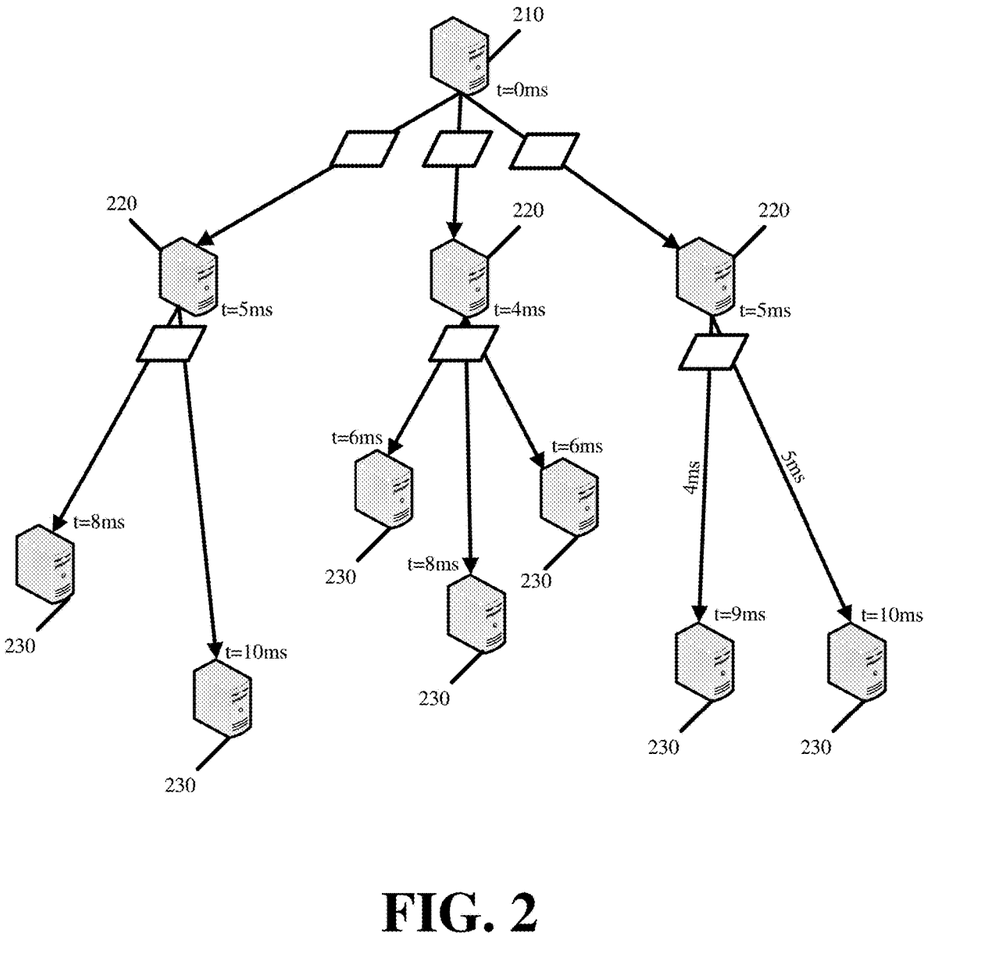
FIG. 2 illustrates performing the optimized message flood of some embodiments based on a tree based traversal of existing connections between the nodes of the distributed platform.

The contacting of nodes through the optimized message flooding of some embodiments is further accelerated based on a tree based traversal of the connections between the nodes. FIG. 2 illustrates performing the optimized message flood of some embodiments based on a tree based traversal of existing persistent connections between the nodes of the distributed platform.

FIG. 2 illustrates a three-tier hierarchical arrangement of node. Although the distributed platform nodes can be organized to more or less tiers depending on the number of nodes, proximity between nodes, and desired flooding behavior.

The root node 210 initiates the message flood, but does not directly contact each and every node of the distributed platform. Instead, the root node 210 initiates the flood by simultaneous sending the flood message to a small subset of children nodes 220. The children nodes 220 then propagate the flood message to their respective children nodes (i.e., grandchildren nodes 230) in a substantially simultaneous and parallel manner.

Each traversal occurs over a few network hops as opposed to long network hauls if the root node was to contact each and every node. Traversing fewer network hops also translates to less potential points of failure in contacting each and every node and faster detection and retrying over a point of failure. Timing for each node traversal is presented in the figure to illustrate the different delays stemming from traversing the entire distributed platform with the parallel tree based traversal.

In some embodiments, the tree based traversal is conducted based on addressing configured to the nodes. A parent node is configured with Internet Protocol (IP) addressing for its children nodes. The addressing for the children nodes coincides with the connections maintained by the parent node. For instance, each server may be configured with addressing for all other servers in the same PoP as well as an address for one server in each other PoP. A particular server can initiate a message flood by contacting the one server in each other PoP as well as the other servers in the same PoP as the particular server. The servers in each other PoP then contact the other servers in the corresponding PoP based on the configured addressing. In some embodiments, the message flooding contacts involve sending a HyperText Transfer Protocol (HTTP) message with a command, configuration, query, response, or other information.

Different tree based traversals of the distributed hierarchical architecture are based on the root node that initiates the flood. For example, if a particular node is contacted during a first flood by a first patent node with a first address, the particular node may select a first set of addressing in order to propagate the flood and contact a first set of children nodes. If the particular node is contacted during a second flood by a different second parent node with a second address, the particular node may select a different second set of addressing in order to propagate the flood and contact a different second set of children nodes.

Some embodiments also provide for selective flooding of the nodes. The selecting flooding isolates the flood to different subsets of the distributed platform nodes. Selective flooding can target nodes in different geographic regions, nodes with addressing in different subnets, Internet Protocol (IP) address blocks, or Autonomous Systems, nodes with particular hardware, nodes with different distributed platform functions (e.g., load balancers, caching servers, storage servers, etc.), or nodes that serve particular types of content or services. In some embodiments, selective flooding involves contacting just the selected nodes. In some other embodiments, selective flooding involves contacting all the nodes with the selected nodes executing and responding in response to the flood messaging. Accordingly, when a particular node is contacted during a full flood, it may propagate the flood and contact a first set of children nodes with a first set of addressing, and when the particular node is contacted during a selective flood, it may propagate the flood and contact a smaller second set of children nodes with a smaller second set of addressing, wherein the second set of children nodes is a subset of the first set of children nodes and the second set of addressing is a subset of the first set of addressing.

The distributed platform nodes return flood responses to the root node based on a reverse traversal of the distributed hierarchical architecture. The reverse traversal is based on the addressing of the flood messaging used to contact each node. In response to a flood contact, the contacted node executes any command, configuration, or query associated with the contact before sending its response to the address of the contacting node. The address of the contacting node is obtained from the HTTP message that the contacting node propagates to the contacted node during the flood. The response can be an acknowledgement that a command was executed or a configuration was applied. The response can also include data. For example, a node can respond to a query for one or more statistics by returning values for those statistics.

Completion of a message flood and compiled responses provide insight into the distributed platform state. In particular, a message flood that completes with a specific subset of responses arriving later than an expected amount of time isolates problems affecting specific geographic regions or servers of the distributed platform. A message flood that completes with responses providing requests rates experienced by each of the servers can be used to detect attacks on different subsets of servers or regions of the distributed platform. As another example, a message flood that completes with responses identifying configuration version numbers on each of the servers assists in maintaining and administering a large distributed platform. At the completion of a message flood, the compiled results are processed by the root node or presented to a user initiating the message flood from the root node.

In some embodiments, a node that redistributes flood messaging to one or more children nodes waits until it receives responses from the children nodes before forwarding those responses along with the node's own response to a parent node in a higher tier of the distributed hierarchical architecture. In some other embodiments, the node that redistributes flood messaging to one or more lower tier nodes sends its own response or a response from a lower tier node up to a parent node in a higher tier as soon as that response is available. The reverse traversal is conducted until the responses from all nodes return to the root node.

Some embodiments optimize the reverse traversal. The reverse traversal optimizations reduce the amount of response messaging and resources consumed in passing the response messaging back through the tiered hierarchy to the root node. In some embodiments, the optimizations include aggregating individual responses from nodes of a lower tier before sending an aggregate response to a node in a higher tier.

Figure 3:
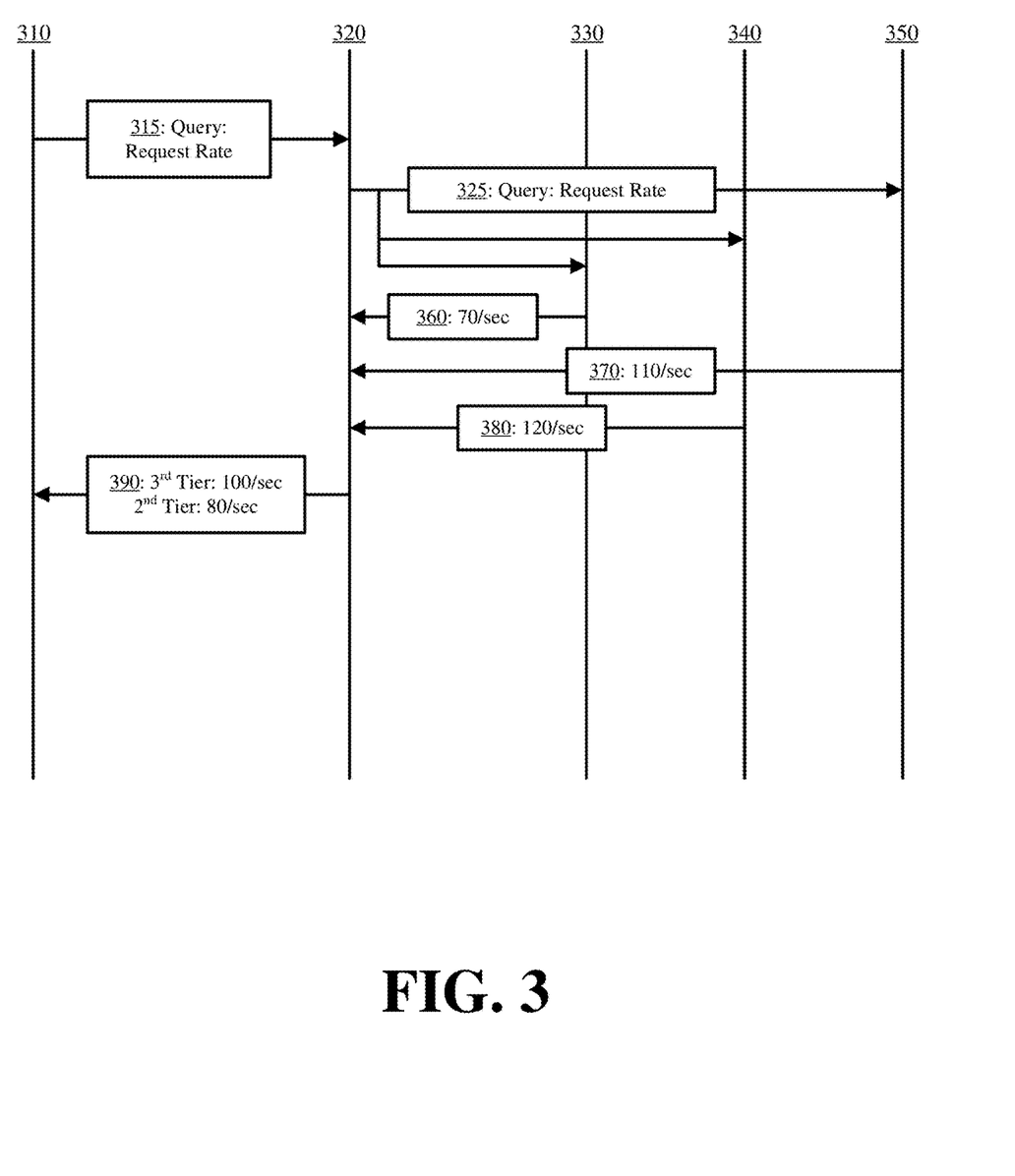
FIG. 3 conceptually illustrates the optimized reverse traversal for responses to a message flood in accordance with some embodiments.

FIG. 3 conceptually illustrates the optimized reverse traversal for responses to a message flood in accordance with some embodiments. As shown in FIG. 3, a first node 310 in a first tier contacts (at 315) a second node 320 in a second tier. The second node 320 then contacts (at 325) third 330, fourth 340, and fifth 350 nodes in a third tier.

The third-tier nodes submit separate responses back to the second node 320 in the second tier at different times. The response from the third node 330 arrives (at 360) at the second node 320 before the response from the fifth node 350, and the response from the fifth node 350 arrives (at 370) at the second node 320 before arrival (at 380) of the response from the fourth node 340.

Rather than send the three responses from the third-tier as well as the second node's 320 own response as separate messages to the first node 310, the second node 320 aggregates the responses into a single message before passing (at 390) the single message to the first node 310. The second node 320 extracts the pertinent information from each third-tier response and merges the information into the single response message. In some embodiments, merging involves appending each separate response as part of the single response message. The information can be merged in the single response message body or as different query string parameters of the single response message. Supplemental information including identifying information for the node producing each corresponding response may also be merged in the single response message. In some embodiments and as shown in FIG. 3, merging involves producing an aggregate information instance based on a computation of the individual information instances from each obtained response. For instance, if each response contained a statistic or metric, the second node can sum the values or compute an average of the values. The second node 320 can then send the computed result to the first node 310 in place the three separate values. The computed result minimizes the amount of data that is propagated back up through each tier of the reverse traversal. Sending the computed result in place of the separate responses results in a loss of granularity. Depending on the initial query, the computed responses may be sufficient or can be followed up with a secondary query for more granular information.

In some embodiments, the flood initiator (i.e., root node) controls the manner with which responses are merged at the different tiers of the distributed hierarchical architecture during the reverse traversal based on parameters or scripts included with the message flood query. The parameters or script specify the desired granularity for responses at each tier by defining what, if any, computations should be performed on the responses. The parameters identify predefined computations that the nodes at the different tiers are configured to perform, such as average, sum, max, min, mean, standard deviation, etc. The script defines a custom set of computations that the nodes perform on the responses compiled at each tier during the reverse traversal.

The above described optimizations accelerate the contacting of the distributed platform nodes and returning of the response, but even with the optimizations implemented, completion time for the message flooding remains tied to the slowest node. An indeterminate completion time renders the message flooding, regardless of the implemented optimizations, unsuitable for time sensitive or real-time applications.

Some embodiments set cascading triggers at each tier of the distributed hierarchical architecture to ensure a determinate completion time for the message flood. The cascading triggers provide failsafes to complete the message flood at each of the tiers even if one or more lower tier nodes are inaccessible, unresponsive, or fail to provide a response within a configurable determinate amount of time. In other words, if a parent node in a particular tier has not received responses to a message flood from all of its children nodes once a condition associated with a trigger is satisfied, the parent node will not wait for the remaining children nodes to respond. Instead, the parent node completes the message flood by submitting its own response and the responses from the subset of children nodes the parent node received before the trigger condition is satisfied. The cascading triggers ensure completion of the message flooding within the parameters of the time sensitive or real-time applications and prevent one or more of the slowest nodes from controlling the completion time.

Each trigger is a condition with which to identify and preempt the slowest nodes of a lower tier in the distributed hierarchical architecture from withholding message flooding completion. Some embodiments provide cascading time-based triggers. Some embodiments provide cascading percentage based triggers.

The cascading time-based triggers instantiate a timer at each node for each message flood. In some embodiments, the same timer is set at each tier of the distributed hierarchical architecture. In some other embodiments, different timers are set at each tier of the distributed hierarchical architecture. The timer limits the amount of time that the corresponding node has to complete its portion of the flood. Each parent node therefore has a set amount of time with which to execute the flood message, produce a response from execution of the flood message, propagate the flood message to its children nodes, and collect and submit responses from the children nodes.

In some embodiments, the cascading time-based triggers are configured according to a total completion time parameter and a reduction vector. The total completion time parameter is the determinate amount of time with which to complete the entirety of the message flood across the entirety of the distributed platform. In other words, the total completion time parameter is the total amount of time available to contact the desired set of nodes in the different tiers and receive responses from the nodes. The reduction vector allocates a lesser amount of the total completion time parameter to each tier. Each lower tier therefore has less time to complete its portion of the flood. The reduced time allocation accounts for the approximate or expected time to contact and receive a response from a lower tier so that the aggregate time for contacting and responding from all tiers of the distributed platform equals the total completion time parameter.

The cascading time-based triggers are set at each tier with the propagation of the HTTP messaging for the flood. The HTTP message from the root node used to contact the nodes in the second tier includes at least the total completion time parameter. In some embodiments, the reduction vector is preconfigured at each node for all message flooding. In some other embodiments, the reduction vector is a configurable parameter that is also included with the flood messaging. The nodes in the second tier reduce the total completion time parameter according to the reduction vector and enter the resulting value in the HTTP messaging used to contact nodes in the third tier.

Figure 4:
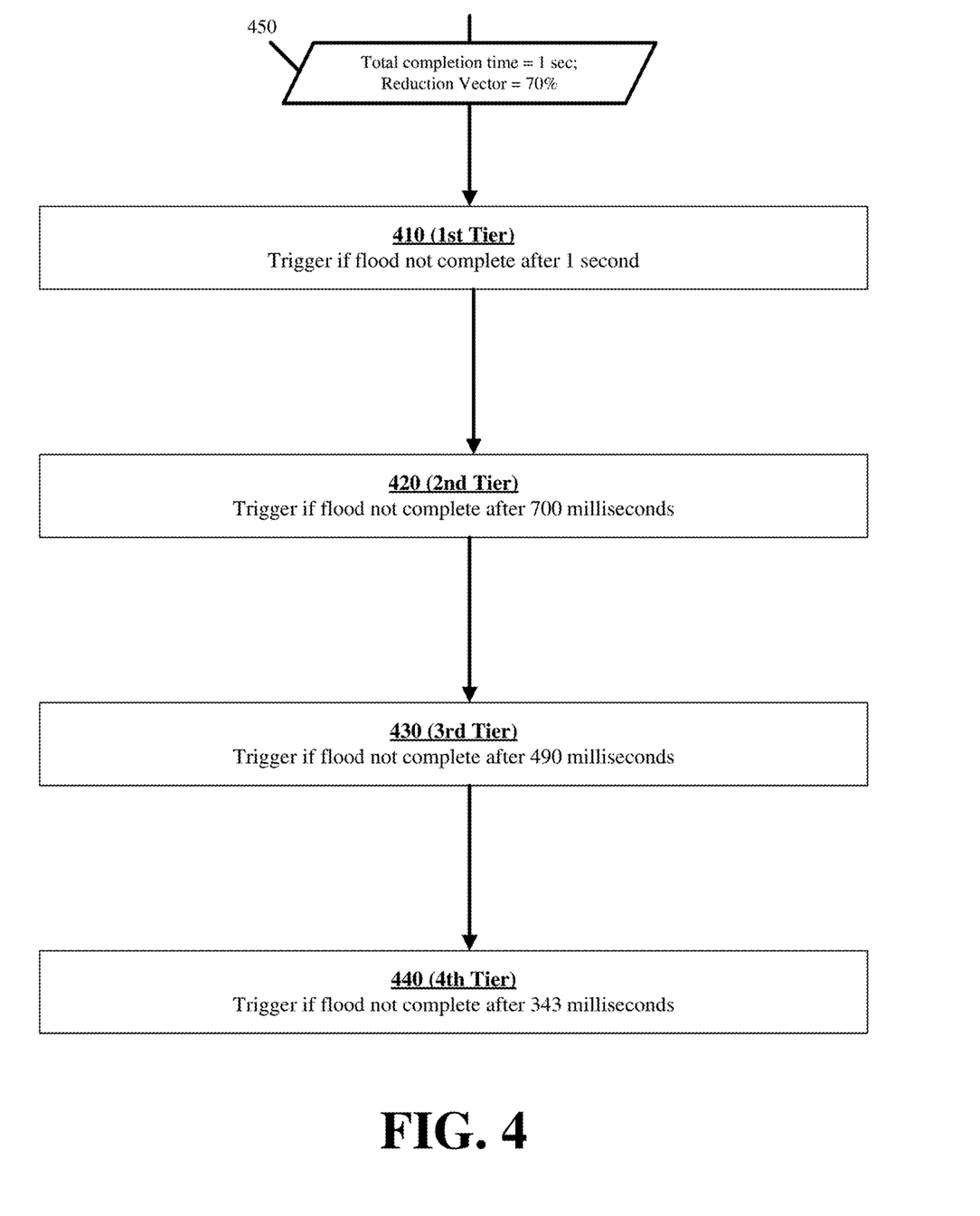
FIG. 4 conceptually illustrates the cascading time-based triggers in accordance with some embodiments.

FIG. 4 conceptually illustrates the cascading time-based triggers in accordance with some embodiments. The figure illustrates the distributed platform with a four-tier message flooding hierarchy—tiers 410, 420, 430, and 440. Flood control parameters 450 issued with the flood set the total completion time parameter for the flood to 1 second and the reduction vector to 70%.

The cascading time-based triggers are set at each tier 410, 420, 430, and 440 based on the total completion time parameter and the reduction vector. In particular, the reduction vector provides the nodes at each lower tier 30% less of the overall time to complete the contacting and response aggregation. The cascading time-based trigger for the second tier 420 is set to 700 milliseconds (ms). The cascading time-based trigger for the third tier 430 is set to 490 ms (70% of 700 ms). The cascading time-based trigger for the fourth tier 440 is set to 343 ms (70% of 490 ms).

Figure 5:
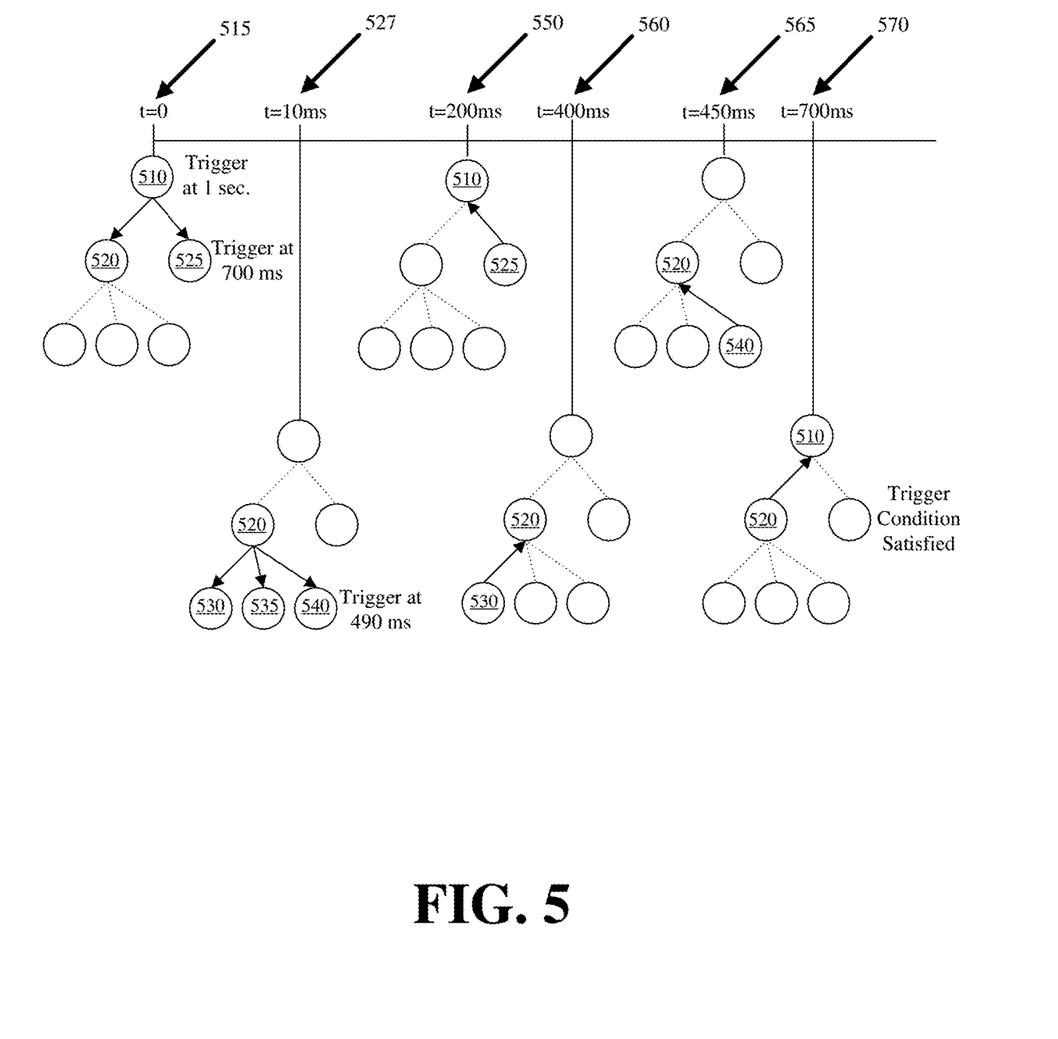
FIG. 5 conceptually illustrates completing a message flood in part because of a time-based trigger in accordance with some embodiments.

FIG. 5 conceptually illustrates completing a message flood in part because of a time-based trigger in accordance with some embodiments. The total completion time parameter for the message flood of FIG. 5 is one second and the reduction vector is again 70%. The message flood is performed relative to a three-tier hierarchical arrangement of nodes.

The root node 510 at the first-tier initiates (at 515) the message flood by propagating the flood message with the time-based trigger to each of its two children nodes 520 and 525, and by starting a timer that expires at the total completion time parameter of one second. The children nodes 520 and 525 receive the message flood and set their own time-based triggers according to the total completion time parameter reduced by the reduction vector. Accordingly, the children nodes 520 and 525 set timers that expire at 700 ms.

The propagation continues with second-tier node 520 distributing (at 527) the message flood with the time-based trigger to its three children nodes 530, 535, and 540 (i.e., grandchildren nodes). The third-tier nodes 530, 535, and 540 receive the message flood and set their own time-based triggers according to the total completion time parameter reduced by two instances of the reduction vector. Accordingly, the third-tier nodes 530, 535, and 540 set timers that expire at 490 ms.

Second-tier node 525 completes the message flood and submits (at 550) its response to the root node 510 before expiration of the time-based trigger for the second tier. Two of the three third-tier nodes 530 and 540 complete the message flood and respond (at 560 and 565) to the second-tier node 520 before expiration of the time-based trigger for the second tier. However, the response from the third third-tier node 535 remains outstanding when the time-based trigger at the second tier expires. The third third-tier node 535 may not respond in time because of a network, server, or other failure.

Expiration of the time-based trigger preempts flood completion and causes the second-tier node 520 to submit (at 570) its response and the subset of responses collected from the third-tier before expiration of the time-based trigger at the second tier. In submitting the responses, the second-tier node 520 may provide an optional error notification identifying its child node 535 that did not successfully complete the flood in the allocated amount of time. The error notification can include addressing or other identifiers for the failing node 535.

In some embodiments, child node responses received after expiration of a time-based trigger at a parent node can be ignored by the parent node to prevent additional messaging and resource consumption. Alternatively, the parent node can return the late response to higher-tier nodes. The late propagated responses can be incorporated into the overall response as they arrive at the flood initiating root node.

The total completion time parameter for the time-based triggers should be set according to the performance characteristics of the distributed platform as well as current conditions relating to congestion and resource usage. Setting the total completion time parameter too low produces a high number of failures rendering the flood results inconsequential. Setting the total completion time parameter too high will cause the completion of the flood to more closely mirror the time needed for the weakest or slowest node in the distributed platform to respond.

As noted above, some embodiments also provide cascading percentage triggers to accelerate completion of the message flood. The cascading percentage triggers comprise a response percentage threshold that is set at each parent node in each tier of the distributed hierarchical architecture.

The response percentage threshold specifies the percentage of children tier nodes that are to respond before the flood at the corresponding tier is complete and responses are passed from the parent node to a grandparent or higher tier node. The response percentage threshold allows the flood propagated by a parent node to complete without the parent node waiting for responses from the slowest subset of children nodes.

Figure 6:
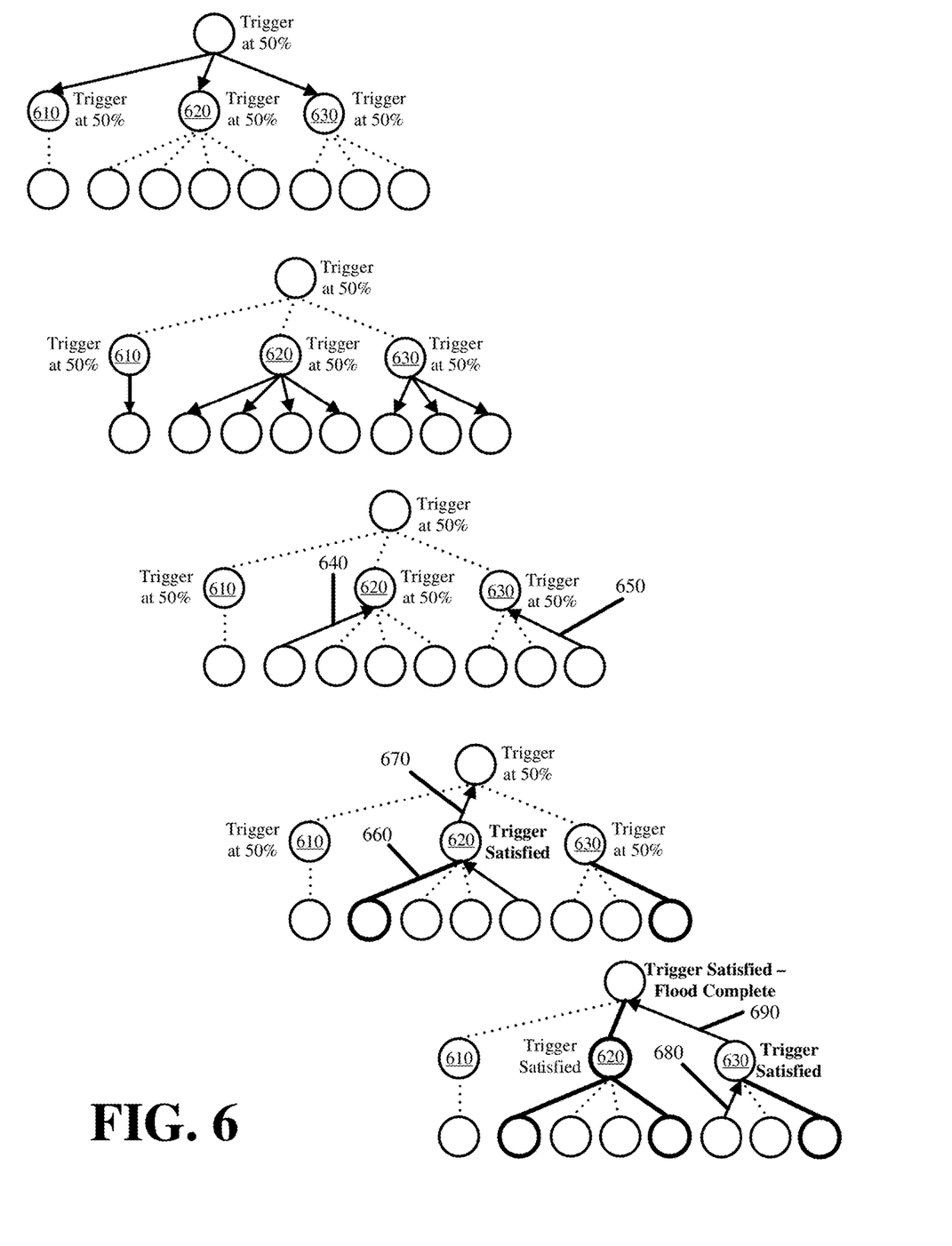
FIG. 6 conceptually illustrates message flooding with cascading percentage triggers in accordance with some embodiments.

FIG. 6 conceptually illustrates message flooding with cascading percentage triggers in accordance with some embodiments. The figure illustrates the distributed platform with a three-tier message flooding hierarchy. The response percentage threshold is set at 50%.

The cascading percentage trigger is set at each parent node at each tier based on the propagation of the HTTP messaging for the flood. Each parent node tracks which children nodes are contacted and which children nodes provide responses to the contacts. The children nodes receive and respond to the messaging as expeditiously as possible.

The flood by a particular parent node is complete once the particular parent node receives responses from one half of its children nodes. Accordingly, second-tier node 610 has a single child node such that its portion of the flood is complete once the single child node responds. Second-tier node 620 has four children nodes such that its portion of the flood is complete once the second-tier node 620 receives the first two responses from the four children nodes. Second-tier node 630 has three children nodes such that its portion of the flood is complete with responses from two of the three children nodes. The entire flood is not complete until two of the three second-tier nodes 610, 620, and 630 complete their portions of the flood and provide the corresponding subset of responses.

Second-tier node 620 receives a response from one of its children nodes at 640 and second-tier node 630 receives a response from one of its children nodes at 650. However, in both cases, the single response is insufficient to satisfy the condition set by the response percentage threshold.

The second-tier node 620 receives a response from a second one of its children nodes at 660. This second response satisfies the response percentage threshold for the second-tier node 620. Consequently, the second-tier node 620 completes its portion of the flood and provides the received responses from the subset of children nodes as well as its own response to the root node at 670. The provided responses can further include error notifications identifying the other children nodes that failed to respond before the response percentage threshold for the second-tier node 620 was satisfied.

Subsequently, the second-tier node 630 receives a response from a second one of its child nodes at 680. This second response satisfies the response percentage threshold for the second-tier node 630, thereby causing the second-tier node 630 to submit the received responses from the subset of children nodes as well as its own response to the root node at 690. The root node has now received responses from two of the three second-tier nodes in satisfaction of the response percentage threshold for the first tier. Accordingly, the entire flood is complete and the responses compiled at the root node can be processed. However, the message flooding completes without responses from the slowest or inaccessible nodes.

The response percentage threshold serves as a control for the desired granularity of the message flood responses. If the threshold is configured too low, the final response may provide an insufficient sampling of data or omit responses from nodes that are under attack or otherwise poorly performing. If the threshold is configured too high, the response sampling will increase. However, the response time will also be impacted by a greater number of the slowest nodes, thereby extending the time to complete the message flood.

In some embodiments, the cascading percentage triggers are configured in conjunction with the cascading time-based triggers. Accordingly, each parent node is configured with two different triggers. Either of the two triggers can cause the flood to complete.

The different triggers (i.e., time versus percentage) set upper bounds and lower bounds for the determinate amount of time to complete the message flood. Completion of the flood in response to the percentage trigger and before expiration of the time-based trigger provides the desired sampling of responses as early as possible. Completion of the flood in response to expiration of the time-based trigger but before satisfying the percentage triggers provides less than the desired samples of responses but ensures the flood does not extend beyond a determinate amount of time, thereby meeting conditions for time sensitive or real-time message flooding applications.

In some embodiments, the message flood involves propagating HTTP messages with the flood parameters defined in the Uniform Resource Locator (URL) of the HTTP messages or as JavaScript Object Notation (JSON) containers that are included in the body of the HTTP messages. The flood parameters specify the message to be flooded, the triggers restricting flood completion, the targeted nodes of the distributed platform, and the type of response aggregation as some examples. The message body can be empty when the flood parameters are specified in the URL. In such cases, the message body can also be populated with supplemental data such as a configuration for the nodes to implement or a script to execute. Responses can be provided in the JSON format and/or included in the body of HTTP response messaging.

The optimized message flooding of some embodiments supports several different types of messages or floods. The types of messages or floods can be differentiated in the URL path, query string parameters, or JSON container submitted with the messages. The optimized message flood of some embodiments can be used to propagate commands, configurations, or queries across the distributed platform nodes.

Commands can be defined as scripts or instructions (i.e., command line prompts) for each of the nodes to execute. Several commands can be listed as different query string parameters or included in the JSON container. The order of the query string parameters can further define the execution order of the commands.

Configurations can be propagated to update or change server operation, control logic, or behavior. The scripts or configurations can be provided in the body of the flooded message. Alternatively, the URL can specify a link or path from where the script or configuration is to be retrieved. For instance, the URL "https://hostdomain/flood/global/ddos-update" propagates a ddos-update configuration to all nodes of the distributed platform.

Queries are requests for information from the distributed platform nodes. Queried for elements can be specified as a list of query string parameters with the responding node providing its values for each of the elements listed in the query string parameters of the message flood URL. The URL "https://hostdomain/flood/global/getinfo?configversion" propagates a query for the version number of a particular configuration running on each distributed platform node.

The URL or JSON container of the flooded message can further set one or more of the time-based or percentage triggers for the flood. Parameter "flood-timeout-ms" can be used to set the total completion time parameter for the time-based trigger in milliseconds and parameter "timeout-ratio" can be used to set the reduction vector for the time-based trigger. In addition or instead of these parameters, the "flood-completion-ratio" parameter can be used to set the response percentage threshold. As the message propagates across the distributed platform nodes, the nodes inspect the query string parameters for presence of the triggers, and if present, extract and configure response operation accordingly.

The flood parameters can also be used to tune the propagation of the message flood to all distributed platform nodes or different subsets of nodes. The subset of nodes can include different PoPs of the distributed platform, nodes in different geographic regions, nodes with addressing in different subnets, Internet Protocol (IP) address blocks, or Autonomous Systems, nodes with particular hardware, nodes with different distributed platform functions (e.g., load balancers, caching servers, storage servers, etc.), or nodes that serve particular types of content or services. In some embodiments, the message is propagated to all nodes with a subset of the nodes implicated by the message executing and responding to the message.

Control parameters within the URL define the manner with which responses propagate back to the flood initiator. The control parameters can specify immediate passing of responses to a higher tier in the node hierarchy. The control parameters can alternatively specify compiling responses from a lower tier in the hierarchy and sending the compiled set of responses in one batch. The control parameters can further specify response processing to occur at each tier of the hierarchy. No processing involves sending the responses as they are received, whereas processing the responses includes performing various computations on the responses and sending the computation result. The processing or computation result can be sent instead or in addition to the original responses. For instance, a message flood may be used to query the request rates at each of the nodes. The responses can be processed so that the average request rate of the nodes at each hierarchical tier is passed instead of the individual request rates experienced by each node in the corresponding hierarchical tier. As noted the above, the computations can calculate the sum, average, min, max, and other mathematical operations on the compiled responses. The computations can further determine if any result or a specific result is provided or count specific responses. In some embodiments, the response processing includes concatenation of strings provided in the response or creation of an array for matched values in the responses. The optimized message flooding also supports any custom response processing or computations that can be specified as scripts passed in conjunction with the message flood.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 7:
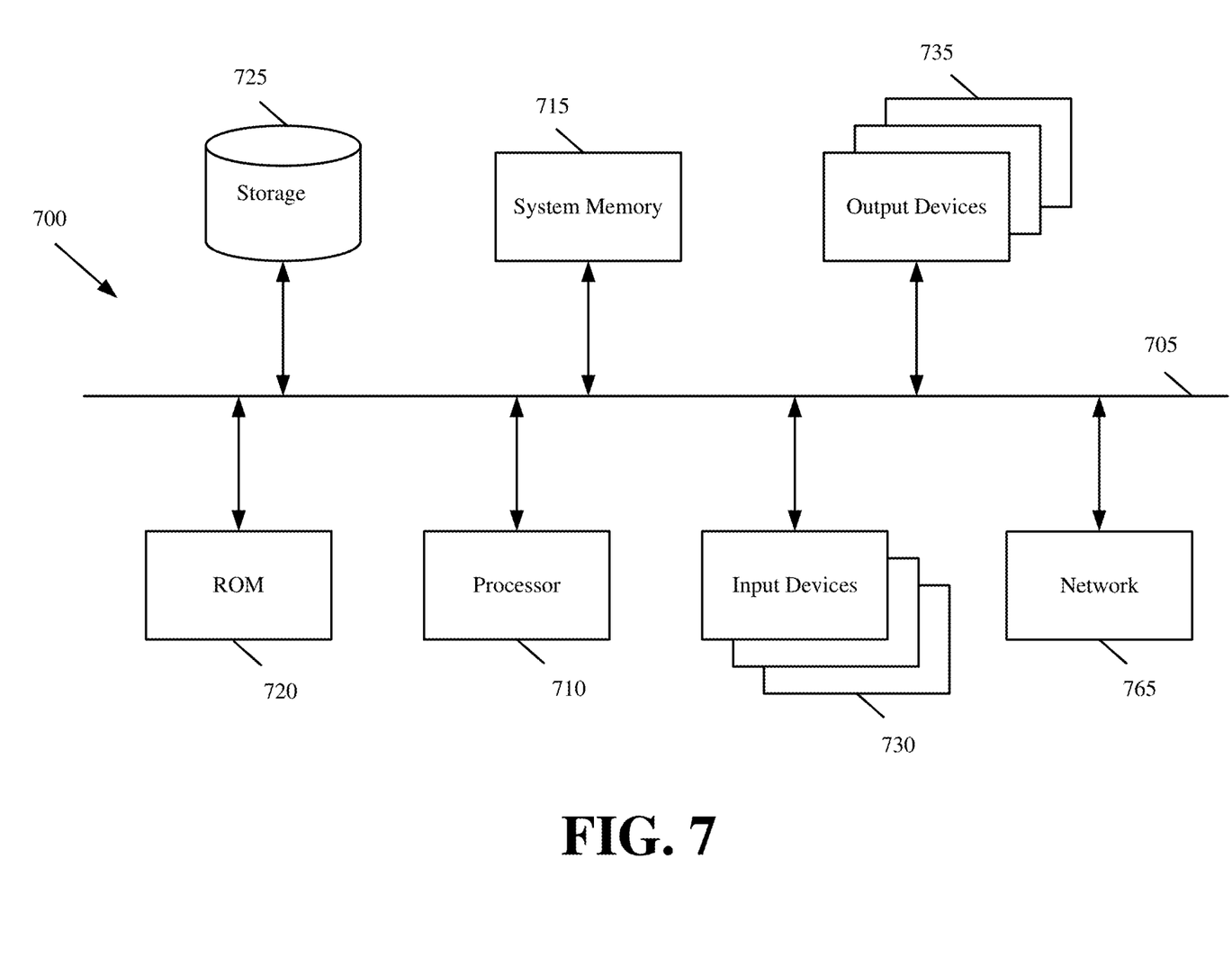
FIG. 7 illustrates a computer system or server with which some embodiments are implemented.

FIG. 7 illustrates a computer system or server with which some embodiments are implemented. Such a computer system includes various types of computer-readable mediums and interfaces for various other types of computer-readable mediums that implement the various methods and machines described above. Computer system 700 includes a bus 705, a processor 710, a system memory 715, a read-only memory 720, a permanent storage device 725, input devices 730, and output devices 735.

The bus 705 collectively represents all system, peripheral, and chipset buses that communicatively connect the numerous internal devices of the computer system 700. For instance, the bus 705 communicatively connects the processor 710 with the read-only memory 720, the system memory 715, and the permanent storage device 725. From these various memory units, the processor 710 retrieves instructions to execute and data to process in order to execute the processes of the invention. The processor 710 is a processing device such as a central processing unit, integrated circuit, graphical processing unit, etc.

The read-only-memory (ROM) 720 stores static data and instructions that are needed by the processor 710 and other modules of the computer system. The permanent storage device 725, on the other hand, is a read-and-write memory device. This device is a non-volatile memory unit that stores instructions and data even when the computer system 700 is off. Some embodiments of the invention use a mass-storage device (such as a magnetic or optical disk and its corresponding disk drive) as the permanent storage device 725.

Other embodiments use a removable storage device (such as a flash drive) as the permanent storage device. Like the permanent storage device 725, the system memory 715 is a read-and-write memory device. However, unlike storage device 725, the system memory is a volatile read-and-write memory, such as random access memory (RAM). The system memory stores some of the instructions and data that the processor needs at runtime. In some embodiments, the processes are stored in the system memory 715, the permanent storage device 725, and/or the read-only memory 720.

The bus 705 also connects to the input and output devices 730 and 735. The input devices enable the user to communicate information and select commands to the computer system. The input devices 730 include alphanumeric keypads (including physical keyboards and touchscreen keyboards), pointing devices. The input devices 730 also include audio input devices (e.g., microphones, MIDI musical instruments, etc.). The output devices 735 display images generated by the computer system. The output devices include printers and display devices, such as cathode ray tubes (CRT) or liquid crystal displays (LCD).

Finally, as shown in FIG. 7, bus 705 also couples computer 700 to a network 765 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 700 may include one or more of a variety of different computer-readable media. Some examples of such computer-readable media include RAM, ROM, read-only compact discs (CD- ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable Blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
    maintaining a first set of existing network connections between a first server and second and third servers, wherein the first, second, and third servers are part of a distributed platform with a plurality of servers distributed across different geographic locations;
    distributing a flood message with a trigger condition from the first server to said second server and said third server over the first set of existing network connections, wherein the flood message is directed to the plurality of servers;
    compiling at the second server before satisfying said trigger condition at the second server, one or more responses to said flood message from a first set of the plurality of servers over a second set of existing network connections maintained between the second server and the first set of servers; and
    submitting said one or more responses from the second server to the first server over an existing connection of the first set of existing network connections in response to satisfying said trigger condition at the second server.

2. The method of claim 1 further comprising compiling at the third server before satisfying said trigger condition at the third server, one or more responses to said flood message from a different second set of the plurality of servers over a third set of existing network connections maintained between the third server and the second set of servers.

3. The method of claim 2 further comprising submitting said one or more responses from the third server to the first server over an existing connection of the first set of existing connections in response to satisfying the trigger condition at the third server, wherein said satisfying the trigger condition at the third server occurs at a different time than said satisfying of the trigger condition at the second server.

4. The method of claim 1, wherein said trigger condition comprises a total completion time and a reduction vector, the method further comprising initiating a timer at the second server based on said total completion time and said reduction vector in response to receiving said flood message from the first server.

5. The method of claim 4 further comprising satisfying said trigger condition at said second server based on said timer exceeding the total completion time less said reduction vector.

6. The method of claim 5 further comprising satisfying said trigger condition at a particular server of the first set of servers based on a timer, that is initiated by said particular server, exceeding the total completion time less two instances of said reduction vector.

7. The method of claim 1, wherein said trigger condition comprises a total completion time and a reduction vector, the method further comprising satisfying said trigger condition at the first server at the total completion time and satisfying said trigger at the second and third servers at the total completion time less said reduction vector.

8. The method of claim 7 further comprising satisfying said trigger condition at each server of the first set of servers at the total completion time less two of said reduction vector.

9. The method of claim 1, wherein said trigger condition comprises a percentage threshold, the method further comprising satisfying said trigger condition at said second server in response to compiling responses from said percentage threshold of servers in the first set of servers.

10. The method of claim 1, wherein a Uniform Resource Locator of said flood message comprises said trigger condition.

11. The method of claim 1, wherein said submitting comprises computing a result from the responses at the second server, and sending, from the second server to the first server, said result as a single data instance, wherein the single data instance represents the responses from the first set of servers.

12. The method of claim 1, wherein said flood message comprises an executable command directed to all servers of the plurality of servers.

13. The method of claim 1, wherein said flood message comprises a query, and wherein the responses from the first set of servers comprise query results from each server of the first set of servers.

14. The method of claim 1 further comprising detecting, at the first server, an attack on the first set of servers in response to the one or more responses from the first set of servers.

15. The method of claim 1, wherein said submitting comprises providing, from the second server to the first server, an error notification for each server of the first set of servers that fails to provide a response to the second server before the trigger condition is satisfied at the second server.

16. A system comprising:
    a plurality of servers distributed across different geographic locations,
    wherein a first server of the plurality of servers is configured to:
        maintain a first set of existing network connections with second and third servers of the plurality of servers; and
        distribute a flood message with a trigger condition to said second server and said third server over the first set of existing network connections, wherein the flood message is directed to the plurality of servers; and
    wherein the second server is configured to:
        compile, before satisfying said trigger condition, one or more responses to said flood message from a first set of the plurality of servers over a second set of existing network connections maintained between the second server and the first set of servers; and
        submit said one or more responses to the first server over an existing connection of the first set of existing network connections in response to satisfying said trigger condition at the second server.

* * * * *